US012770016B1

(12) United States Patent
Mogill

(10) Patent No.: US 12,770,016 B1
(45) Date of Patent: Oct. 20, 2026

(54) APPARATUS AND METHOD FOR DETERMINING AN OUTPUT COMPRISING AN UPDATED SIMILARITY SCORE MATRICES

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/350,348

(22) Filed: Oct. 6, 2025

(51) Int. Cl.
*G06N 3/092* (2023.01)
*G06N 3/09* (2023.01)

(52) U.S. Cl.
CPC ............... *G06N 3/092* (2023.01); *G06N 3/09* (2023.01)

(58) Field of Classification Search
CPC ................................. G06N 3/092; G06N 3/09
See application file for complete search history.

(56) References Cited

U.S. PATENT DOCUMENTS

| | | | | |
|---|---|---|---|---|
| 11,977,965 | B1 | 5/2024 | Shen et al. | |
| 2018/0190135 | A1 | 7/2018 | Robichaux et al. | |
| 2020/0104395 | A1* | 4/2020 | Bhatia | G06F 16/26 |
| 2020/0364270 | A1 | 11/2020 | Harpale | |
| 2023/0162018 | A1* | 5/2023 | Yang | G06N 3/08 706/25 |
| 2023/0237590 | A1 | 7/2023 | Aronovich et al. | |
| 2024/0355318 | A1* | 10/2024 | Beaver | G10L 15/063 |
| 2025/0062035 | A1* | 2/2025 | Masood | G16H 50/20 |
| 2025/0124371 | A1 | 4/2025 | Masood et al. | |
| 2025/0217667 | A1* | 7/2025 | Wang | G06N 5/01 |
| 2025/0292574 | A1* | 9/2025 | Chen | G06V 20/70 |
| 2025/0390896 | A1* | 12/2025 | Raval | G06Q 10/40 |

FOREIGN PATENT DOCUMENTS

| | | |
|---|---|---|
| CN | 106021298 A | 10/2016 |

OTHER PUBLICATIONS

Bekamiri et al. ("PatentSBERTa: A deep NLP based hybrid model for patent distance and classification using augmented SBERT", vol. 206, Sep. 2024) (Year: 2024).*
Juell et al. ("Using Reinforcement Learning for Similarity Assessment in Case-Based Systems", vol. 18, Issue 4, pp. 60-67, Pub Date: 2003) (Year: 2003).*

(Continued)

*Primary Examiner* — Imad Kassim
(74) *Attorney, Agent, or Firm* — CALDWELL LLC

(57) ABSTRACT

An apparatus and method for determining an output comprising an updated similarity score matrices. The apparatus includes at least a processor and a memory communicatively connected to the at least a processor. The memory instructs the processor to receive a plurality of input data associated with entity profiles, encode the plurality of input data into multi-dimensional embeddings, wherein the multi-dimensional embeddings represent a plurality of numerical vectors corresponding to resources and organizations of the entity profiles, generate similarity score matrices as a function of filtered multi-dimensional embeddings, update, using a trained reinforcement learning optimizer, the similarity score matrices based on weighted coefficients assigned to each matrix of the similarity score matrices, generate, using the at least a processor, an output as a function of the updated similarity score matrices.

19 Claims, 7 Drawing Sheets

(56) References Cited

OTHER PUBLICATIONS

Zhang et al. ("ROLeR: Effective Reward Shaping in Offline Reinforcement Learning for Recommender Systems", CIKM '24, Oct. 21-25, 2024, pp. 3269-3278) (Year: 2024).*
Du et al. ("Visual Interfaces for Recommendation Systems: Finding Similar and Dissimilar Peers", vol. 10, No. 1, Article 9. Publication date: Nov. 2018.) (Year: 2018).*

* cited by examiner

APPARATUS AND METHOD FOR DETERMINING AN OUTPUT COMPRISING AN UPDATED SIMILARITY SCORE MATRICES

FIELD OF THE INVENTION

The present invention generally relates to the field of machine learning. In particular, the present invention is directed to an apparatus and a method for determining an output comprising an updated similarity score matrices.

BACKGROUND

Large and complex datasets often include numerous entity profiles with varying attributes that are difficult to compare in a meaningful way. Existing techniques can struggle to represent high-dimensional input data in a manner that preserves subtle relationships across different features. This can lead to similarity assessments that are inaccurate, inconsistent, or insufficiently adaptive to changes in the data.

SUMMARY OF THE DISCLOSURE

In an aspect, an apparatus for determining an output comprising an updated similarity score matrices includes at least a processor and a memory communicatively connected to the at least a processor. The memory contains instructions configuring the processor to receive a plurality of input data associated with entity profiles, encode the plurality of input data into multi-dimensional embeddings, wherein the multi-dimensional embeddings represent a plurality of numerical vectors corresponding to resources and organizations of the entity profiles, generate similarity score matrices as a function of filtered multi-dimensional embeddings, update, using a trained reinforcement learning optimizer, the similarity score matrices based on weighted coefficients assigned to each matrix of the similarity score matrices, generate, using the at least a processor, an output as a function of the updated similarity score matrices.

In another aspect, a method for determining an output comprising an updated similarity score matrices includes receiving, using at least a processor, a plurality of input data associated with entity profiles, encoding, using the at least a processor, the plurality of input data into multi-dimensional embeddings, wherein the multi-dimensional embeddings represent a plurality of numerical vectors corresponding to resources and organizations of the entity profiles, generating, using the at least a processor, similarity score matrices as a function of filtered multi-dimensional embeddings, wherein filtering the multi-dimensional embeddings comprises quantifying, using a similarity model, a degree of alignment between a plurality of embeddings of the multi-dimensional embeddings, updating, using a trained reinforcement learning optimizer, the similarity score matrices based on weighted coefficients assigned to each matrix of the similarity score matrices, generating, using the at least a processor, an output as a function of the updated similarity score matrices.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a block diagram of an exemplary machine-learning process;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining an output comprising an updated similarity score matrices. The apparatus includes at least a computing device comprised of a processor and a memory communicatively connected to the processor. The memory instructs the processor to receive a plurality of input data associated with entity profiles. The processor encodes the plurality of input data into multi-dimensional embeddings, wherein the multi-dimensional embeddings represent a plurality of numerical vectors corresponding to resources and organizations of the entity profiles. The processor generates similarity score matrices as a function of filtered multi-dimensional embeddings. Additionally, the processor updates, using a trained reinforcement learning optimizer, the similarity score matrices based on weighted coefficients assigned to each matrix of the similarity score matrices. The processor generates, using the at least a processor, an output as a function of the updated similarity score matrices.

Figure 1:
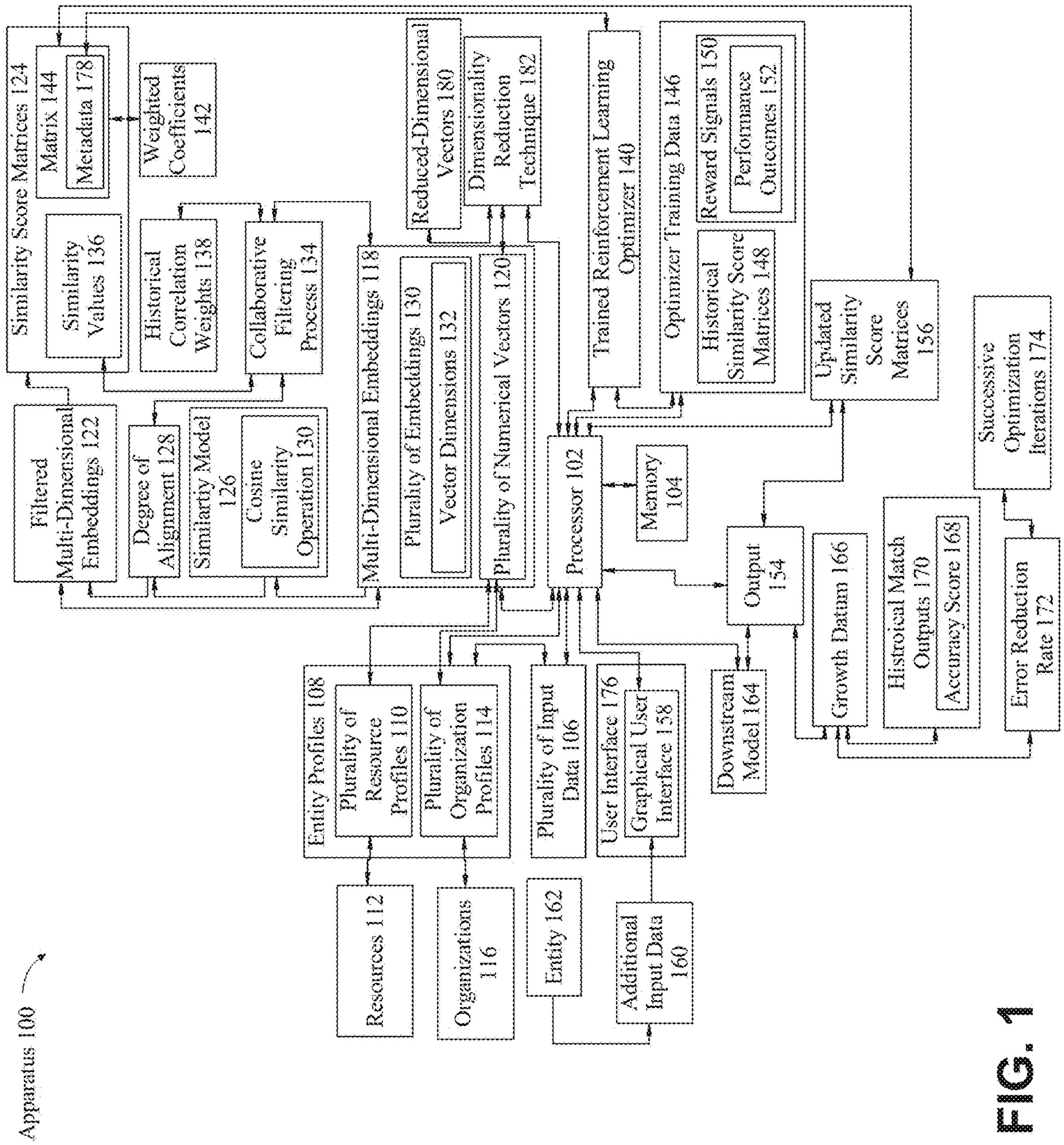
FIG. 1 is a block diagram of an apparatus for determining an output comprising an updated similarity score matrices.

Referring now to FIG. 1, an exemplary embodiment of apparatus 100 for determining an output comprising an updated similarity score matrices is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a plurality of input data 106 associated with entity profiles 108. As used in this disclosure, an "input data" is data that is provided to a system, model, or process for analysis, processing, or transformation. Without limitation, the input data 106 may include structured, semi-structured, or unstructured data originating from one or more sources. As used in this disclosure, an "entity data" is data that characterizes, describes, or is otherwise associated with a specific entity 162. Without limitation, the entity 162 data may represent a person, object, organization, device, process, or other definable unit within a system or dataset. The input data 106 may include structured data such as certifications, years of experience, areas of expertise, and the like; semi-structured data such as survey responses from leadership style assessments; and unstructured data such as narrative feedback from past clients. These forms of entity 162 data may collectively describe the coach and provide the basis for generating embeddings that capture the coach's professional attributes. In another non-limiting example, processor 102 may receive input data 106 associated with an entity profile 108 of a client firm. The input data 106 may include structured data such as industry classification codes, employee headcount, and revenue growth metrics; semi-structured data such as responses to organizational culture questionnaires; and unstructured data such as open-ended statements of leadership development goals from firm executives. This entity 162 data may enable the apparatus 100 to model the characteristics of the firm for use in similarity scoring and matching. In a further non-limiting example, processor 102 may receive input data 106 from a computing system serving as an entity 162. The entity 162 data in this case may include machine-generated logs of prior engagements, metadata 178 about communication frequency between coaches and clients, or historical alignment scores calculated in earlier iterations of the apparatus 100. Such data may be incorporated into entity profiles 108 that allow the processor 102 to refine similarity relationships.

With continued reference to FIG. 1, the entity profiles 108 may include a plurality of resource profiles 110 associated with the resources 112 and a plurality of organization profiles 114 associated with the organizations 116. As used in this disclosure, a "resource" is an individual, system, tool, or other asset that may be utilized to perform, support, or enhance an activity, process, or function. Without limitation, the resource may include a coach, a mentor, a consultant, a trainer, a subject matter expert, a digital platform, or a technical system. As used in this disclosure, a "resource profile" is a collection of data, attributes, or information that characterizes or describes a resource. The resource profile may include identification details, qualifications, expertise, availability, performance metrics, or other parameters relevant to the use or management of the resource. As used in this disclosure, an "organization" is a structured entity, group, or body formed to pursue one or more objectives. Without limitation, the organization may include a firm, a corporation, a partnership, an institution, a nonprofit, a governmental body, or another type of collective arrangement. As used in this disclosure, an "organization profile" is a collection of data, attributes, or information that characterizes an organization. Without limitation, the organization profile may include identification details, structure, objectives, resources, operational parameters, performance data, or other relevant information associated with the organization. In an embodiment, entity profiles 108 may include a plurality of resource profiles 110 associated with resources 112 and a plurality of organization profiles 114 associated with organizations 116. A resource profile may capture information that characterizes an individual, system, or tool utilized in the matching process. In an embodiment, a coach's resource profile may include identification details such as name and location, qualifications such as certifications in executive leadership, areas of expertise such as communication strategy, availability schedules, and performance metrics derived from prior client engagements. In another embodiment, a digital platform serving as a resource may have a resource profile including attributes such as supported languages, integration capabilities, uptime metrics, and user satisfaction ratings. In an embodiment, an organization profile may capture information that characterizes the attributes, structure, or goals of an organization. An organization profile for a client firm may include identification details such as industry sector, size, and geographic footprint, organizational objectives such as scaling leadership capacity or improving retention, operational parameters such as available training budgets, and performance data such as historical growth rates or employee engagement scores. In another embodiment, an educational institution serving as an organization may have an organization profile describing its academic programs, institutional hierarchy, strategic goals, and student outcome metrics. In an embodiment, the inclusion of multiple resource profiles 110 and organization profiles 114 may enable the apparatus 100 to generate a robust representation of both resources 112 and organizations 116, thereby supporting the processor 102 in identifying and evaluating alignment across a wide range of attributes and contexts.

Still referring to FIG. 1, processor 102 is configured to encode the plurality of input data 106 into multi-dimensional embeddings 118, wherein the multi-dimensional embeddings 118 represent a plurality of numerical vectors 120 corresponding to resources 112 and organizations 116 of the entity profiles 108. As used in this disclosure, a "multi-dimensional embedding" is a mathematical representation of data in a multi-dimensional space, where input data 106 is transformed into one or more points or structures within that space such that semantic, structural, or relational characteristics of the input data 106 are preserved or reflected. As used in this disclosure, a "numerical vector" is an ordered array of numerical values that represents one or more attributes, features, or dimensions of data. Without limitation, the numerical vector 120 may be used to encode the characteristics of resources 112, organizations 116, or other components in a form that is processable by computational models or algorithms.

Without limitation, the coach's input data 106 may include structured values such as years of experience, certification level, session availability, and the like; semi-structured values such as scores from a leadership style inventory; and unstructured values such as narrative performance feedback. This data may be transformed into a numerical vector 120, such as a 200-dimensional array, where individual dimensions may correspond to features like leadership expertise, communication adaptability, or industry familiarity. The resulting embedding may capture the coach's unique professional attributes in a manner suitable for computational comparison. In another embodiment, processor 102 may encode input data 106 from a client firm's organization profile into a multi-dimensional embedding. The firm's data may include structured values such as industry classification codes, revenue tier, employee headcount, and the like; semi-structured values such as responses to cultural assessment surveys; and unstructured values such as written descriptions of leadership development objectives. This data may be represented as a numerical vector 120, such as a 250-dimensional array, where dimensions may capture features like organizational culture strength, growth priorities, historical engagement trends, and the like. The embedding may preserve semantic relationships such that firms with similar leadership cultures are positioned closer together in the embedding space. In another embodiment, both resource embeddings and organization embeddings may be generated within a shared multi-dimensional space. This configuration may enable the processor 102 to compare the numerical vectors 120 directly, preserving similarity relationships across entity 162 types. For example, a coach embedding emphasizing innovation-focused leadership support may be situated closer in the vector space to a firm embedding reflecting a need for entrepreneurial leadership development, thereby indicating strong alignment between the two entities. In an embodiment, processor 102 may be configured to encode input data 106 from a coach's resource profile into a multi-dimensional embedding. The coach's input data 106 may include structured values such as years of experience, certification level, and session availability; semi-structured values such as scores from a leadership style inventory; and unstructured values such as narrative performance feedback. This data may be transformed into a numerical vector 120, such as a 200-dimensional array, where individual dimensions may correspond to features like leadership expertise, communication adaptability, or industry familiarity. For illustration, dimension 1 may equal 15 years of coaching experience, dimension 2 may equal 0.88 cultural adaptability score, and dimension 3 may equal 0.95 leadership style alignment score. The resulting embedding may preserve these features in vector form, enabling computational comparison with other entities. In another embodiment, processor 102 may encode input data 106 from a client firm's organization profile into a multi-dimensional embedding. The firm's data may include structured values such as industry classification codes, revenue tier, and employee headcount; semi-structured values such as responses to cultural assessment surveys; and unstructured values such as written descriptions of leadership development objectives. This data may be represented as a numerical vector 120, such as a 250-dimensional array, where dimensions may capture features like organizational culture strength, growth priorities, or historical engagement trends. For example, dimension 1 may equal 0.82 innovation emphasis score, dimension 2 may equal 0.91 collaborative culture index, and dimension 3 may equal 0.75 executive leadership development priority score. In a further embodiment, both resource embeddings and organization embeddings may be generated within a shared multi-dimensional space. This configuration may enable the processor 102 to compare the numerical vectors 120 directly, preserving similarity relationships across entity 162 types. For instance, a cosine similarity operation 130 between a coach embedding vector [15, 0.88, 0.95, . . . ] and a firm embedding vector [0.82, 0.91, 0.75, . . . ] may yield a similarity score of 0.91, indicating a strong alignment between the coach's leadership style and the firm's development needs.

Without limitation, the apparatus 100 may include a matching engine that assigns coaches to client firms based on competency alignment, coaching style, and cultural fit. Both coaches and firms may be encoded into multi-dimensional embeddings 118 derived from coaching history, leadership assessments, and communication profiles. As used in this disclosure, a "matching engine" is a computational component, module, or system configured to compare, evaluate, and align a plurality of entities based on one or more attributes, criteria, or parameters, thereby generating one or more matches or recommendations. The matching engine may utilize algorithms, heuristics, rules, machine learning models, or combinations thereof to determine similarity, compatibility, or optimization between entities. In a non-limiting example, the matching engine may be used to assign resources 112, such as coaches, to organizations 116, such as firms, based on competency alignment, style preferences, performance history, cultural fit, or other factors represented within multi-dimensional embeddings 118 or numerical vectors 120.

Still referring to FIG. 1, processor 102 is configured to generate similarity score matrices 124 as a function of filtered multi-dimensional embeddings 122. As used in this disclosure, a "similarity score matrix" is a structured representation in which each element of the matrix 144 encodes a numerical value indicative of the degree of similarity, compatibility, or alignment between pairs of entities. Without limitation, the structured representation may include a two-dimensional array or table. The similarity score matrix may be generated through distance metrics, correlation measures, machine learning models, or other computational techniques applied to numerical vectors 120, multi-dimensional embeddings 118, or other representations of the entities. In a non-limiting example, a similarity score matrix may quantify how closely a resource, such as a coach, aligns with an organization, such as a firm, based on attributes including competency, style, or cultural fit, thereby providing a basis for match ranking, recommendation, or optimization. In a non-limiting example, the processor 102 may generate a similarity score matrix for three coaches and three firms, wherein Coach A may achieve similarity scores of 0.92 with Firm X, 0.85 with Firm Y, and 0.67 with Firm Z, Coach B may achieve similarity scores of 0.81 with Firm X, 0.89 with Firm Y, and 0.74 with Firm Z, and Coach C may achieve similarity scores of 0.65 with Firm X, 0.71 with Firm Y, and 0.90 with Firm Z. This structured representation may enable the apparatus 100 to identify that Coach A aligns most strongly with Firm X, Coach B aligns most strongly with Firm Y, and Coach C aligns most strongly with Firm Z, thereby providing a computational foundation for ranking and recommending optimal matches.

With continued reference to FIG. 1, the at least a processor 102 may be further configured to filter the multi-dimensional embeddings 118, wherein filtering the multi-dimensional embeddings 118 comprises quantifying, using a similarity model 126, a degree of alignment 128 between a plurality of embeddings of the multi-dimensional embeddings 118. As used in this disclosure, an "embedding" is a numerical representation of data in a vector space, where the representation encodes semantic, structural, or relational characteristics of the data such that entities with similar properties are located in closer proximity within the space. As used in this disclosure, a "similarity model" is a computational framework, algorithm, or machine learning construct configured to evaluate and quantify relationships among embeddings, wherein the similarity model 126 may apply one or more mathematical operations, distance functions, or learned parameters to determine the closeness, compatibility, or correspondence between a plurality of embeddings. As used in this disclosure, a "degree of alignment" is a quantified measure indicating the extent to which two or more embeddings share similarity, correspondence, or compatibility, where the degree of alignment 128 may be expressed as a score, probability, distance, or other numerical value derived from the similarity model 126. In an embodiment, processor 102 may be configured to filter multi-dimensional embeddings 118 of coaches and firms by applying a similarity model 126 that quantifies degrees of alignment. A cosine similarity model 126 may be used to compare the embeddings, resulting in scores that reflect how closely a coach's attributes align with a firm's needs. In a non-limiting example, a coach embedding may include values for leadership expertise, communication adaptability, and industry familiarity, while a firm embedding may include values for leadership development goals, communication preferences, and industry sector. The similarity model 126 may output a degree of alignment 128 of 0.91 for the coach-firm pair, indicating strong compatibility, while another coach-firm pair may only achieve a score of 0.48, reflecting weaker alignment. In another embodiment, processor 102 may apply a collaborative filtering similarity model 126 to quantify relationships between embeddings by leveraging historical engagement data. For instance, if a particular coach has a history of success with firms in the technology sector, the collaborative filtering model may assign higher alignment scores to embeddings of new firms that share similar cultural or operational attributes with those prior engagements. In this example, the degree of alignment 128 may increase from 0.75 to 0.88 after filtering, reflecting the model's adjustment based on learned historical patterns. In a further embodiment, processor 102 may filter embeddings by applying multiple similarity models 126 and combining their outputs into a composite alignment score. For example, cosine similarity may initially yield a score of 0.83 between a coach and a firm, while a machine learning-based similarity model 126 trained on engagement outcomes may yield a score of 0.87. The processor 102 may average or weight these results to produce a final degree of alignment 128 of 0.85, which may then be used in downstream similarity score matrices 124.

With continued reference to FIG. 1, the at least a processor 102 may be further configured to determine the degree of alignment 128 between the plurality of embeddings by performing a cosine similarity operation 130 across vector dimensions 132 of the plurality of embeddings and executing a collaborative filtering process 134 to adjust similarity values 136 as a function of historical correlation weights 138. As used in this disclosure, a "cosine similarity operation" is a mathematical operation that measures the cosine of the angle between two non-zero vectors in a multi-dimensional space, where the resulting value represents the degree of similarity between the vectors irrespective of their magnitude. In a non-limiting example, values closer to 1 may indicate greater similarity, values near 0 may indicate orthogonality, and values closer to −1 may indicate dissimilarity. As used in this disclosure, a "vector dimension" is an individual component, coordinate, or feature of a numerical vector 120 or embedding, where the collective set of vector dimensions 132 defines the position of the vector in the multi-dimensional space and encodes the characteristics of the underlying data. In a non-limiting example, vector dimensions 132 may represent attributes such as competency levels, stylistic traits, or communication tendencies. As used in this disclosure, a "collaborative filtering process" is a computational technique that predicts or adjusts similarity values 136, preferences, or matches by leveraging patterns of behavior, choices, or relationships observed across multiple entities. In a non-limiting example, collaborative filtering may refine similarity determinations based on the past matching success of coaches with firms that share similar profiles. As used in this disclosure, a "historical correlation weight" is a numerical factor derived from prior data that reflects the strength, frequency, or significance of past associations, outcomes, or interactions between entities, and may be applied to adjust similarity values 136 or alignment scores. In a non-limiting example, historical correlation weights 138 may be applied to increase the likelihood of recommending a coach who has consistently achieved positive results with comparable organizations 116.

With continued reference to FIG. 1, in an embodiment, processor 102 may be configured to determine the degree of alignment 128 between a coach embedding and a firm embedding by performing a cosine similarity operation 130 across their respective vector dimensions 132. A coach embedding may include dimensions representing attributes such as leadership style adaptability, industry expertise, and communication tendencies, while a firm embedding may include dimensions representing attributes such as desired leadership competencies, organizational culture, and communication preferences. A cosine similarity operation 130 across these vectors may yield a similarity score of 0.89, which indicates strong alignment between the coach and the firm in terms of their competency focus and stylistic compatibility. This score may serve as the initial measure of alignment before further refinement. In another embodiment, processor 102 may execute a collaborative filtering process 134 to adjust the similarity score as a function of historical correlation weights 138. For instance, historical engagement data may show that coaches with similar profiles to the selected coach have repeatedly achieved high client satisfaction when paired with firms sharing cultural characteristics with the selected firm. A historical correlation weight of 1.10 may therefore be applied to the initial cosine similarity score of 0.89, producing an adjusted similarity score of 0.98. This refined degree of alignment 128 may more accurately reflect the likelihood of a successful pairing, since it incorporates both the mathematical proximity of embeddings and empirically observed outcomes from past matches.

Still referring to FIG. 1, processor 102 is configured to update, using a trained reinforcement learning optimizer 140, the similarity score matrices 124 based on weighted coefficients 142 assigned to each matrix of the similarity score matrices 124. As used in this disclosure, a "trained reinforcement learning optimizer" is a computational model or algorithm that applies reinforcement learning techniques to iteratively improve decision-making, predictions, or parameter updates based on feedback from prior actions or outcomes. In a non-limiting example, a trained reinforcement learning optimizer 140 may adjust similarity score matrices 124 by rewarding alignment outcomes that lead to successful coach-firm matches and penalizing outcomes associated with poor matches. As used in this disclosure, a "weighted coefficient" is a numerical factor applied to a variable, parameter, or element to influence its contribution within a mathematical function, model, or computation. In a non-limiting example, weighted coefficients 142 may be assigned to emphasize cultural fit more heavily than coaching style when updating similarity score matrices 124. As used in this disclosure, a "matrix" is a two-dimensional arrangement of elements, typically numbers, organized into rows and columns for purposes of computation, transformation, or structured representation of relationships. In a non-limiting example, a matrix 144 may represent similarity scores across multiple coaches and firms, where each row corresponds to a coach and each column corresponds to a firm. In an embodiment, processor 102 may employ a trained reinforcement learning optimizer 140 to iteratively update similarity score matrices 124. During training, the optimizer may evaluate past coach-firm pairings, receive feedback in the form of reward signals 150, and adjust the weighting of factors such as competency alignment, coaching style, and cultural fit. The similarity score matrices 124 may initially be populated with raw alignment scores generated from cosine similarity operations 130 or collaborative filtering models. Weighted coefficients 142 may then be applied to emphasize factors that historically correlated with successful outcomes, while deemphasizing factors that were less predictive. Through repeated iterations, the optimizer may refine these matrices to increase the probability that higher-ranked pairings yield successful engagements. In a non-limiting example, a similarity score matrix may include three coaches compared against three firms. The initial cosine similarity scores may indicate that Coach A aligns with Firm X at 0.82, Coach B with Firm Y at 0.79, and Coach C with Firm Z at 0.75. Historical outcomes may show that cultural fit was the strongest predictor of success in 70% of prior engagements, while coaching style alignment contributed significantly in only 40% of engagements. A weighted coefficient of 1.5 may therefore be applied to cultural fit values in the similarity score matrix, while a coefficient of 0.8 may be applied to coaching style values. After applying these adjustments, the optimizer may update Coach A's score with Firm X to 0.90, reflecting the strong cultural alignment, while Coach B's score with Firm Y may adjust to 0.83, and Coach C's score with Firm Z may adjust to 0.78. Through successive training iterations, the reinforcement learning optimizer may continue to tune the weighted coefficients 142 until the similarity score matrices 124 consistently prioritize pairings with the highest probability of producing favorable outcomes.

With continued reference to FIG. 1, at least a processor 102 may be further configured to train the reinforcement learning optimizer using optimizer training data 146, wherein the optimizer training data 146 comprises historical similarity score matrices 148 and corresponding reward signals 150, the reward signals 150 quantifying performance outcomes 152 of past weighting actions applied to the historical similarity score matrices 148. As used in this disclosure, "training data" is a collection of data provided to a computational model for the purpose of learning patterns, relationships, or decision rules during a training process. In a non-limiting example, training data may include similarity score matrices 124, reward signals 150, or performance outcomes 152 associated with prior coach-firm assignments. As used in this disclosure, "historical similarity score matrices" are similarity score matrices 124 generated from past computations or interactions that reflect prior assessments of alignment between entities. In a non-limiting example, historical similarity score matrices 148 may capture comparisons between coaches and firms across competency, coaching style, and cultural fit dimensions from earlier engagements. As used in this disclosure, "reward signals" are feedback indicators used in reinforcement learning that quantify the quality, success, or desirability of an action or decision taken by a model. In a non-limiting example, reward signals 150 may be positive when a coach-firm match leads to strong engagement outcomes and negative when the match yields poor results. As used in this disclosure, "performance outcomes" are measurable results produced by an action, process, or decision. In an embodiment, the performance outcomes 152 may be used to evaluate effectiveness or success. In a non-limiting example, performance outcomes 152 may include client satisfaction ratings, retention metrics, or leadership development progress following a coaching engagement. As used in this disclosure, "past weighting actions" are prior assignments of weighted coefficients 142 applied to similarity score matrices 124 to influence the relative importance of one or more factors in the computation of similarity. In a non-limiting example, a past weighting action may have increased the weight of cultural fit while decreasing the weight of coaching style in a prior iteration of similarity scoring.

Without limitation, similarity scoring models such as cosine similarity and collaborative filtering may determine optimal pairings. Reinforcement learning optimizers may continuously improve matching accuracy by weighing successful pairings more heavily. This may ensure that firms are paired with coaches most likely to accelerate growth outcomes. In a non-limiting example, the apparatus 100 may receive input data 106 comprising a coach's historical engagements, including leadership assessments, client feedback scores, and communication profiles. This data may be encoded into multi-dimensional embeddings 118, where vector dimensions 132 correspond to factors such as subject-matter expertise, coaching style tendencies, and communication preferences. A firm's input data 106 may likewise be encoded into embeddings, with vector dimensions 132 capturing organizational needs, cultural attributes, and leadership development objectives. In another non-limiting example, cosine similarity operations 130 may be performed across vector dimensions 132 of the embeddings to determine alignment between a coach and a firm. A cosine similarity score of 0.92 may be produced for a first coach-firm pairing, reflecting strong alignment of leadership style and communication preferences, while a cosine similarity score of 0.45 may be produced for a second coach-firm pairing, reflecting weak alignment. In another non-limiting example, a collaborative filtering process 134 may be applied to adjust similarity values 136 based on historical engagement data. For instance, if firms with similar cultural profiles previously achieved high satisfaction ratings when matched with a particular coach, the collaborative filtering process 134 may increase the similarity score for new candidate firms that share those cultural traits. In another non-limiting example, historical similarity score matrices 148 may serve as training data for a reinforcement learning optimizer. Reward signals 150 may be derived from performance outcomes 152, such as a +1 reward when client firms report measurable leadership growth within six months of engagement, or a −1 reward when retention rates decrease following a pairing. The optimizer may learn to assign higher weighted coefficients 142 to cultural fit and coaching style while reducing the weighting of less predictive factors, such as geographic proximity. In a non-limiting example, the reinforcement learning optimizer may continuously update its weighting strategy. Over multiple training iterations, the optimizer may learn that firms emphasizing rapid innovation achieve the best outcomes when paired with coaches who have a history of successfully guiding entrepreneurial teams. As a result, the optimizer may automatically increase the weighting applied to innovation-related competency dimensions in future similarity score matrices 124, thereby improving the accuracy of subsequent matches.

With continued reference to FIG. 1, in an embodiment, processor 102 may be configured to train the reinforcement learning optimizer using optimizer training data 146 that comprises historical similarity score matrices 148 and corresponding reward signals 150. The historical similarity score matrices 148 may encode alignment scores between coaches and firms from earlier engagements, with values distributed across competency, coaching style, and cultural fit dimensions. Reward signals 150 may then quantify the performance outcomes 152 of those engagements, such as whether a pairing led to measurable improvements in leadership capacity, high satisfaction ratings, or improved retention rates. The optimizer may analyze these historical similarity score matrices 148 alongside their associated reward signals 150 to learn which weighting strategies most reliably predicted positive outcomes. Through this training process, the optimizer may refine its ability to assign weighted coefficients 142 to alignment factors, thereby improving the accuracy of similarity scoring in future iterations. In a non-limiting example, a historical similarity score matrix may show that Coach A aligned with Firm X at 0.85, Coach B with Firm Y at 0.78, and Coach C with Firm Z at 0.72. Reward signals 150 linked to these past matches may indicate that Coach A and Firm X achieved strong performance outcomes 152, such as a 95% satisfaction rating and measurable growth in executive leadership skills, while the other matches produced weaker results. The reinforcement learning optimizer may interpret this feedback as evidence that cultural fit was a more decisive factor than coaching style in determining success. As a result, the optimizer may learn to apply a higher weighting to cultural fit in subsequent updates to similarity score matrices 124, while reducing the weight applied to coaching style. Through successive training cycles using historical matrices and reward signals 150, the optimizer may continue to refine its weighting strategies so that future predictions are increasingly aligned with observed performance outcomes 152. In an embodiment, processor 102 may train the reinforcement learning optimizer using multiple sets of optimizer training data 146 that include historical similarity score matrices 148 and corresponding reward signals 150. In a first training cycle, a similarity score matrix may indicate that Coach A aligns with Firm X at 0.82, Coach B aligns with Firm Y at 0.77, and Coach C aligns with Firm Z at 0.70. Reward signals 150 may show that the Coach A-Firm X pairing produced a strong outcome with a client satisfaction score of 92%, while the other pairings yielded weaker results. The optimizer may interpret these results as evidence that competency alignment was highly predictive of success in this cycle and may increase the weighting of competency dimensions across the similarity score matrix. In a second training cycle, a new historical similarity score matrix may indicate that Coach A aligns with Firm Y at 0.75, Coach B aligns with Firm Z at 0.83, and Coach C aligns with Firm X at 0.68. Reward signals 150 may show that the Coach B-Firm Z pairing produced the best performance outcomes 152, with retention of 95% of coached leaders, while the others underperformed. The optimizer may adjust its weighting strategy to emphasize cultural fit more heavily, as analysis of the data may reveal that cultural alignment accounted for the successful outcome. In a third training cycle, the optimizer may analyze a historical matrix where Coach A aligns with Firm Z at 0.79, Coach B aligns with Firm X at 0.73, and Coach C aligns with Firm Y at 0.81. Reward signals 150 may reveal that the Coach C-Firm Y match achieved the best results, with leadership development scores improving by 40% within six months. The optimizer may then refine its weighting strategy again, this time increasing the influence of communication style alignment. Across these successive training cycles, the reinforcement learning optimizer may learn that different alignment factors contribute differently depending on context and may combine this learning into a balanced weighting scheme that consistently improves the accuracy of match predictions.

Still referring to FIG. 1, processor 102 is configured to generate an output 154 as a function of the updated similarity score matrices 156. As used in this disclosure, an "output" is a result, data structure, or computational artifact generated as a function of one or more inputs, transformations, or intermediate computations. In a non-limiting example, the output 154 may include an updated embedding set, a similarity score matrix, or a ranked list of alignment scores, rather than a direct assignment of a coach to a firm. Without limitation, the output 154 may represent updated embeddings or score sets that encode the quantified degree of alignment 128 between resources 112 and organizations 116 following optimization. Continuing, the outputs 154 may serve as intermediate computational artifacts that can be further processed, stored, or presented for downstream use, such as informing a matching engine or visualizing relative alignment strengths, without constituting the final assignment of entities. In an embodiment, processor 102 may generate an output 154 as a function of the updated similarity score matrices 156, where the output 154 may take the form of a refined set of embeddings. For instance, a coach embedding may initially occupy a position in the vector space with a similarity score of 0.85 relative to a firm embedding. After optimization, the updated embedding set may shift the coach vector such that the similarity score with the firm increases to 0.91, reflecting a recalibration based on reinforced weighting of cultural fit. This updated embedding may be included in the output 154 and stored for later use by downstream model 164. In another embodiment, the processor 102 may generate an output 154 in the form of a ranked list of alignment scores derived from an updated similarity score matrix. For example, the updated matrix may indicate that Coach A achieves a similarity score of 0.94 with Firm X, Coach B achieves a similarity score of 0.87 with Firm X, and Coach C achieves a similarity score of 0.81 with Firm X. The output 154 may therefore include a ranked ordering of Coach A, Coach B, and Coach C in descending order of alignment strength. This ranked list may then be consumed by a matching engine, presented through a user interface 176, or stored for later retrieval, without directly constituting the final human-level assignment of a coach to a firm.

With continued reference to FIG. 1, the at least a processor 102 may be further configured to receive additional input data 160 from an entity 162 through a graphical user interface 158, wherein the at least a processor 102 is further configured to update the similarity score matrices 124 as a function of the additional input data 160. As used in this disclosure, "additional input data" is data provided to supplement or extend a primary set of input data. Without limitation, the additional input data 160 may contribute further context, features, or parameters for processing, analysis, or model training. In a non-limiting example, additional input data 160 may include demographic information, engagement feedback, performance metrics, or external datasets that enhance the accuracy or relevance of similarity scoring, embedding generation, or matching processes. As used in this disclosure, an "entity" is an identifiable individual, organization, computer system, or other definable unit. Without limitation, the entity 162 may generate, provide, or be associated with data for processing within the apparatus 100. In a non-limiting example, an entity 162 may include a coach supplying updated availability, a firm providing revised leadership development needs, or a computing system transmitting integration data through an application programming interface. A "graphical user interface," as used herein, is a graphical form of user interface 176 that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 158. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 158 and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler May detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 158. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device may include a data structure. As used in this disclosure, "data structure" is a way of organizing data represented in a specialized format on a computer configured such that the information can be effectively presented in a graphical user interface 158. In an embodiment, the data structure includes any input data 106. In an embodiment, the data structure contains data and/or rules used to visualize the graphical elements within a graphical user interface 158. In an embodiment, the data structure may include any data described in this disclosure. In an embodiment, the data structure may be configured to modify the graphical user interface 158, wherein data within the data structure may be represented visually by the graphical user interface 158. In an embodiment, the data structure may be continuously modified and/or updated by processor 102, wherein elements within graphical user interface 158 may be modified as a result. In an embodiment, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output 154 displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 158 (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity 162. In an embodiment, display device may be configured to project or show visual content generated by computers, video devices, or other electronic mechanisms. In an embodiment, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In an embodiment, display device may be configured to present a graphical user-interface (GUI) to a user, wherein a user may interact with a GUI. In an embodiment, a user may view a GUI through display. Additionally, or alternatively, processor 102 be connected to display device. In one or more embodiments, transmitting the output 154 may include displaying the output 154 at display device using a visual interface.

With continued reference to FIG. 1, the entity 162, which may include an individual such as a coach, an organization such as a client firm, or a computer system providing automated updates, may provide new or revised data that supplements existing input data 106 used for embedding generation and similarity scoring. The at least a processor

102 may be configured to update the similarity score matrices 124 as a function of this additional input data 160, thereby refining the alignment values between resources 112 and organizations 116. In a specific, non-limiting example, a coach may update their profile through the graphical user interface 158 to indicate completion of a new certification in executive leadership. This additional input data 160 may be encoded into updated embeddings for the coach, resulting in a recalibration of the similarity score matrices 124. Firms seeking executive leadership development support may then register stronger alignment scores with that coach, increasing the likelihood of being identified as an optimal match.

With continued reference to FIG. 1, in an embodiment, processor 102 may be further configured to receive additional input data 160 from an entity 162 through a graphical user interface 158, and the processor 102 may update similarity score matrices 124 as a function of this additional input data 160. The entity 162 may include an individual resource such as a coach, an organization such as a client firm, or a computing system configured to transmit supplemental data. The additional input data 160 may provide updated or refined characteristics that alter the embeddings associated with the entity 162, thereby influencing similarity scores. In a non-limiting example, a coach may use the graphical user interface 158 to update their availability or add a newly earned certification, and this data may be encoded into the resource's embedding. The updated embedding may then increase alignment scores with firms seeking leadership expertise in the newly certified area. In another example, a firm may input revised leadership development priorities through the graphical user interface 158, such as emphasizing executive coaching over team development, and the processor 102 may adjust the similarity score matrix to reflect stronger alignment with coaches who specialize in executive leadership. In this manner, the apparatus 100 may dynamically incorporate evolving entity 162 data into its optimization process, ensuring that similarity computations remain accurate and contextually relevant.

With continued reference to FIG. 1, the at least a processor 102 may be further configured to execute a downstream model 164 as a function of the output 154, wherein the downstream model 164 is configured to match at least a resource of the resources 112 to at least an organization of the organizations 116. As used in this disclosure, a "downstream model" is a computational model, process, or algorithm that consumes the output 154 of an upstream computation and applies additional processing, transformation, or decision-making to produce a subsequent result. In a non-limiting example, a downstream model 164 may take as input updated similarity score matrices 156 or embeddings and generate recommendations, rankings, or assignments of resources 112 to organizations 116. The downstream model 164 may operate by consuming the updated similarity score matrices 156 produced by the reinforcement learning optimizer and applying ranking, selection, or optimization logic to identify the strongest alignments. In a non-limiting example, the downstream model 164 may generate a ranked list of candidate coaches for a firm, where the rankings are determined by the degree of alignment 128 encoded in the updated embeddings, and the top-ranked coach is recommended for assignment. In a specific, non-limiting example, the output 154 of processor 102 may include a similarity score matrix reflecting updated alignment values between a set of ten coaches and five firms. The downstream model 164 may process this output to identify that Coach A has the highest similarity score (0.94) with Firm X, based on shared leadership development priorities and a history of successful engagements with culturally similar organizations 116. The downstream model 164 may then rank Coach A as the top recommendation for Firm X, followed by Coach C (0.87) and Coach F (0.81), thereby generating a prioritized list of candidate matches for downstream decision-making.

With continued reference to FIG. 1, the at least a processor 102 may be further configured to refine the output 154 using the trained reinforcement learning optimizer 140 based on a growth datum 166, wherein the growth datum 166 is calculated as a function of an accuracy score 168 of historical match outputs 170 and an error reduction rate 172 determined across successive optimization iterations 174. As used in this disclosure, a "growth datum" is a calculated value that represents improvement, advancement, or progress of a computational model or matching process over time. In a non-limiting example, a growth datum 166 may be derived from accuracy scores 168 of prior matches and reductions in error observed across multiple optimization iterations. As used in this disclosure, an "accuracy score" is a numerical measure of how closely the predicted match outputs correspond to observed or desired outcomes. In a non-limiting example, an accuracy score 168 may quantify the percentage of coach-firm matches that achieved target leadership development outcomes. As used in this disclosure, "historical match outputs" are records or results of previously generated outputs from a matching process, which may be evaluated to determine alignment quality, performance outcomes 152, or prediction accuracy. In a non-limiting example, historical match outputs 170 may include ranked lists of coaches recommended to firms and the observed engagement results of those recommendations. As used in this disclosure, an "error reduction rate" is the quantified rate at which predictive or alignment errors decrease as a model undergoes successive rounds of optimization. In a non-limiting example, the error reduction rate 172 may reflect how quickly mismatches decrease as reinforcement learning refines weighting strategies across iterations. As used in this disclosure, "successive optimization iterations" are sequential rounds of model training, updating, or refinement performed repeatedly to improve computational accuracy or predictive performance. In a non-limiting example, successive optimization iterations 174 may involve repeatedly updating weighted coefficients 142 in similarity score matrices 124 until alignment errors converge below a defined threshold. In a non-limiting example, historical match outputs 170 may indicate that, during an initial optimization cycle, the matching engine achieved an accuracy score 168 of 72%, reflecting the percentage of coach-firm pairings that led to positive leadership development outcomes. After a first optimization iteration, the accuracy score 168 may improve to 85%, yielding an error reduction rate 172 of 46% compared to the initial cycle. Following a second optimization iteration, the accuracy score 168 may increase again to 91%, with a further error reduction rate 172 of 40% relative to the prior iteration. The reinforcement learning optimizer may calculate a growth datum 166 by combining these improvements in accuracy and reductions in error across successive iterations. The growth datum 166 may then be applied to refine the output embeddings or similarity score matrices 124, ensuring that future recommendations are increasingly aligned with successful match outcomes. With continued reference to FIG. 1, the at least a processor 102 may be further configured to display, using a user interface 176, the output 154 by ranking the updated similarity score matrices 156, wherein each matrix comprises metadata 178 associated with the resources 112 and organizations 116. As used in this disclosure, a "user interface" is a graphical, textual, auditory, or interactive medium that enables a user to view, access, or manipulate data processed by a system. In a non-limiting example, a user interface 176 may include a graphical display, dashboard, or application screen that presents similarity scores, rankings, or recommendations. As used in this disclosure, "metadata" is data that describes or provides context for other data, including attributes, descriptors, or identifiers that characterize resources 112, organizations 116, or computational outputs. In a non-limiting example, metadata 178 may include coach identifiers, firm industry classifications, timestamps of engagements, or confidence scores associated with a similarity matrix. In a non-limiting example, processor 102 may generate an updated similarity score matrix comparing a plurality of coaches to a client firm, wherein the matrix 144 may indicate that Coach A achieves a similarity score of 0.93, Coach B achieves a similarity score of 0.89, and Coach C achieves a similarity score of 0.82. The output 154 may be displayed through a user interface 176 in ranked order such that the coaches are listed from highest to lowest alignment score. Metadata 178 may be presented alongside each ranking entry, and such metadata 178 may include, without limitation, coach identifiers, areas of expertise, certifications, historical engagement success rates, or cultural alignment indices. In this manner, the user interface 176 may enable decision-makers at the client firm to view not only the ranked similarity scores but also relevant contextual information associated with each resource, thereby facilitating informed selection decisions.

With continued reference to FIG. 1, the at least a processor 102 may be further configured to compress the multi-dimensional embeddings 118 into reduced-dimensional vectors 180 using a dimensionality reduction technique 182, wherein the reduced-dimensional vectors 180 are configured to minimize storage and preserve similarity relationships among the entity profiles 108. As used in this disclosure, "reduced-dimensional vectors" are numerical vectors that result from compressing higher-dimensional embeddings into a space with fewer dimensions, while retaining as much of the original information as possible. In a non-limiting example, reduced-dimensional vectors 180 may be generated to reduce computational overhead and storage requirements while maintaining alignment accuracy among entity profiles 108. As used in this disclosure, a "dimensionality reduction technique" is a computational method or algorithm configured to transform high-dimensional data into a lower-dimensional representation while preserving relevant structural or relational characteristics of the data. In a non-limiting example, dimensionality reduction techniques 182 may include principal component analysis, singular value decomposition, or autoencoder-based compression. As used in this disclosure, "similarity relationships" are quantified measures or structural associations that reflect the relative degree of alignment 128, correspondence, or proximity among embeddings or vectors within a computational space. In a non-limiting example, similarity relationships may capture the closeness of coaches and firms based on competencies, cultural factors, or historical engagement outcomes. In a non-limiting example, processor 102 may be configured to compress multi-dimensional embeddings 118 representing coaches and firms into reduced-dimensional vectors 180. A coach profile may initially be encoded as a 500-dimensional embedding that includes features such as competencies, coaching style preferences, prior engagement results, and communication tendencies. A dimensionality reduction technique such as principal component analysis may then reduce this representation into a 50-dimensional vector while preserving similarity relationships with firm embeddings. In this manner, storage requirements may be minimized while ensuring that coaches with similar profiles remain positioned closely together in the reduced-dimensional space. In another non-limiting example, the processor 102 may apply an autoencoder-based dimensionality reduction technique to compress organizational embeddings. A firm embedding may include 300 dimensions capturing attributes such as industry sector, leadership culture, developmental objectives, and historical coaching outcomes. The autoencoder may compress the embedding into a 30-dimensional vector, and the compressed representation may maintain similarity relationships with embeddings of firms from comparable industries. This may enable the apparatus 100 to continue determining that two firms emphasizing innovation and rapid scaling align more closely with entrepreneurial coaches than with structured operational coaches, even though the underlying representations have been reduced in dimensionality.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
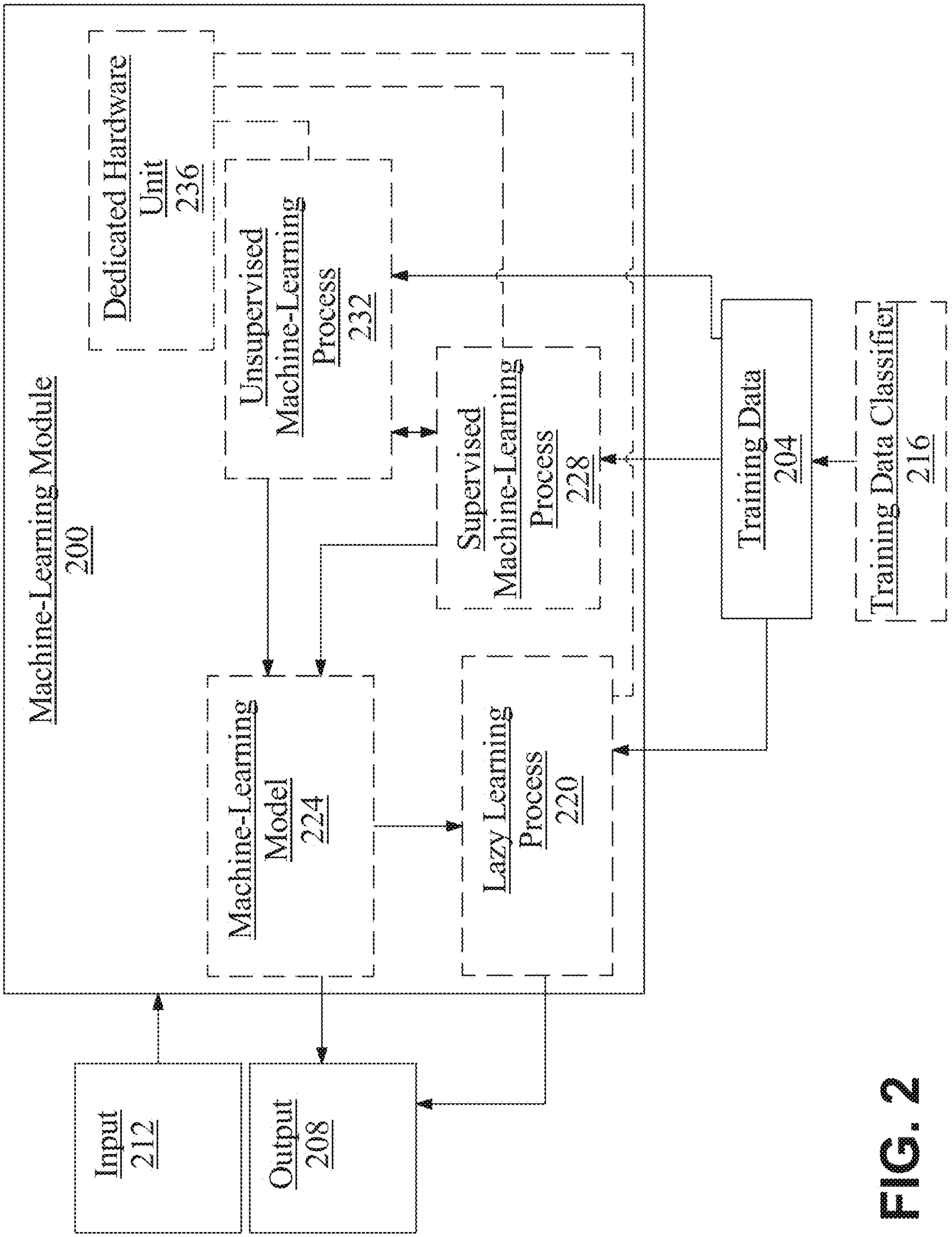
FIG. 2 is an exemplary illustration of a graphical user interface displaying an output.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include input data, entity profiles, and additional input data, and outputs may include updated similarity score matrices.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to characterize a sub-population, such as a cohort of persons, a grouping of organizational entities, or another collection of analyzed items or phenomena for which a subset of training data may be selected.

Still referring to FIG. 2, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{min}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data, entity profiles, and additional input data as described above as inputs, and updated similarity score matrices as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
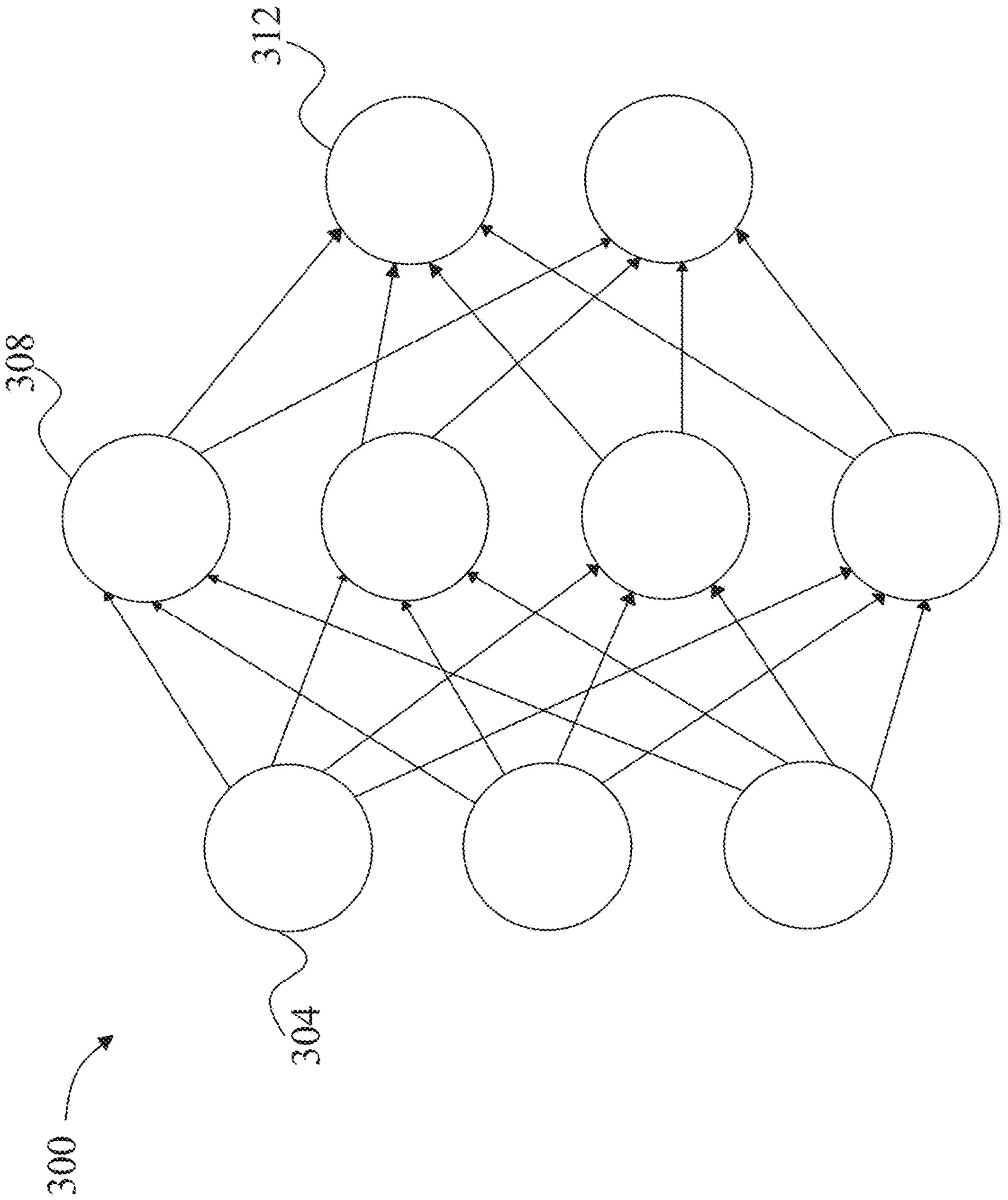
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
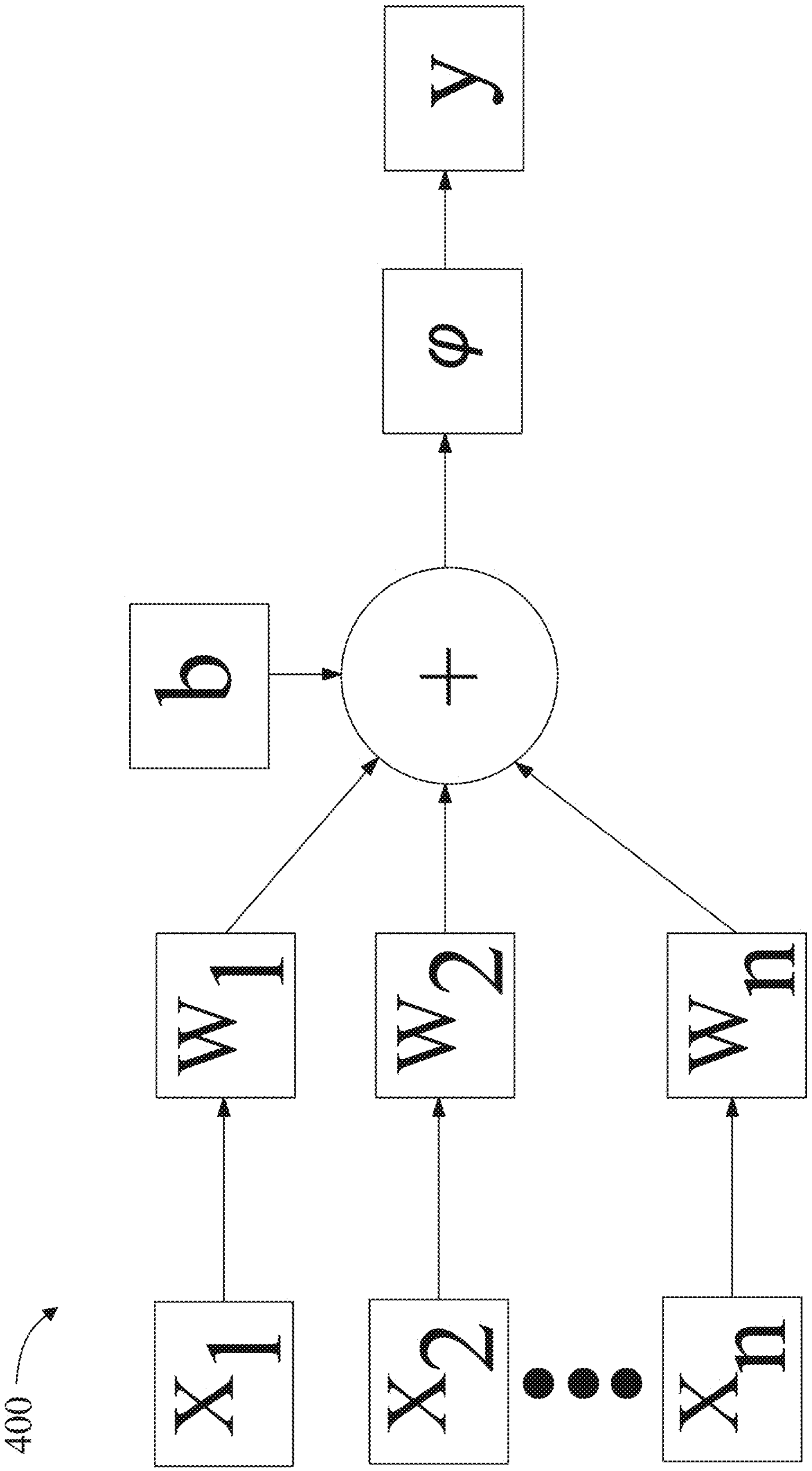
FIG. 4 is a diagram of an exemplary embodiment of a node of a neural network.

Referring now to FIG. 4, an exemplary embodiment of a node 400 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
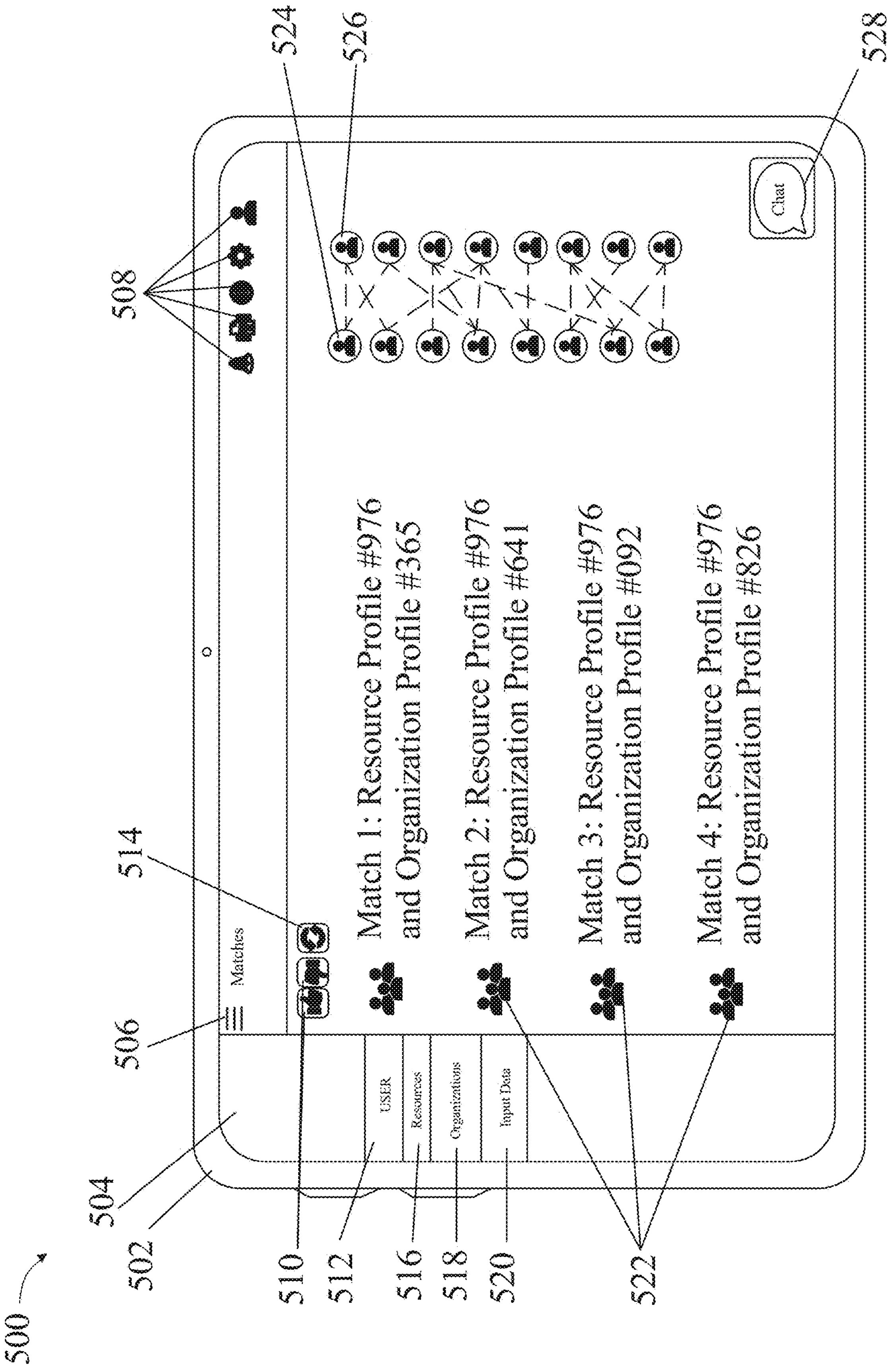
FIG. 5 is an exemplary illustration of a graphical user interface.

Referring now to FIG. 5, an exemplary illustration 500 of a graphical user interface. In an embodiment, the exemplary illustration 500 may include a downstream device 502. In an embodiment, the exemplary illustration 500 may be rendered on a downstream device 502, such as a tablet computer, laptop, or mobile phone, which allows a user to interact with the system. In an embodiment, the downstream device 502 may include a graphical user interface 504. In an embodiment, the downstream device 502 may include a graphical user interface 504 that provides access to system functions and presents resource and organization data to the user. In an embodiment, the graphical user interface 504 may include a menu button 506. In an embodiment, the graphical user interface 504 may include a menu button 506, shown as a collapsible icon in the upper-left corner, which when selected may expand to reveal navigation items such as resources, organizations, or input data. In an embodiment, the graphical user interface 504 may include one or more user controls 508. In an embodiment, the graphical user interface 504 may include one or more user controls 508. In a non-limiting example, the user controls 508 may include icons representing functions such as search, filter, sorting options, or administrative actions accessible from the top-right corner of the interface. In an embodiment, the graphical user interface 504 may include a feedback button 510. In an embodiment, the graphical user interface 504 may include a feedback button 510, which may allow a user to submit comments, system feedback, or error reports directly within the interface. In an embodiment, the graphical user interface 504 may include a user identifier 512. In an embodiment, the graphical user interface 504 may include a user identifier 512, which may display account details such as a username, profile name, or authentication status. In an embodiment, the graphical user interface 504 may include a refresh button 514. In an embodiment, the graphical user interface 504 may include a refresh button 514, which may be used to reload matches or update the most recent data set. For example, a user may select the refresh button 514 to generate new matches based on recently uploaded input data. In an embodiment, the graphical user interface 504 may include a resources tab 516. In an embodiment, the graphical user interface 504 may include a resources tab 516, which when selected may display a list of resource profiles available for matching. In an embodiment, the graphical user interface 504 may include an organization tab 518. In an embodiment, the graphical user interface 504 may include an organization tab 518, which when selected may display one or more organization profiles. In an embodiment, the graphical user interface 504 may include an input data tab 520. In an embodiment, the graphical user interface 504 may include an input data tab 520, which may enable a user to upload, enter, or adjust information that informs the matching algorithm. In an embodiment, the graphical user interface 504 may include one or more matches 522. In an embodiment, the graphical user interface 504 may include one or more matches 522. In a non-limiting example, each match 522 may display a resource profile paired with an organization profile, such as "Match 1: Resource Profile #976 and Organization Profile #365." In an embodiment, the graphical user interface 504 may include one or more resource profiles 524. In an embodiment, the graphical user interface 504 may include one or more resource profiles 524, displayed as individual icons on the right side of the matches. Each resource profile 524 may represent a candidate, asset, or system resource available for pairing. In an embodiment, the graphical user interface 504 may include one or more organization profiles 526. In an embodiment, the graphical user interface 504 may include one or more organization profiles 526, also displayed as icons. Each organization profile 526 may represent a company, department, or group available for pairing with a corresponding resource profile. In an embodiment, the graphical user interface 504 may include a chatbot 528. In an embodiment, the graphical user interface 504 may include a chatbot 528, shown in the lower-right corner, which may provide automated assistance, answer user queries, or guide the user through the matching process.

Figure 6:
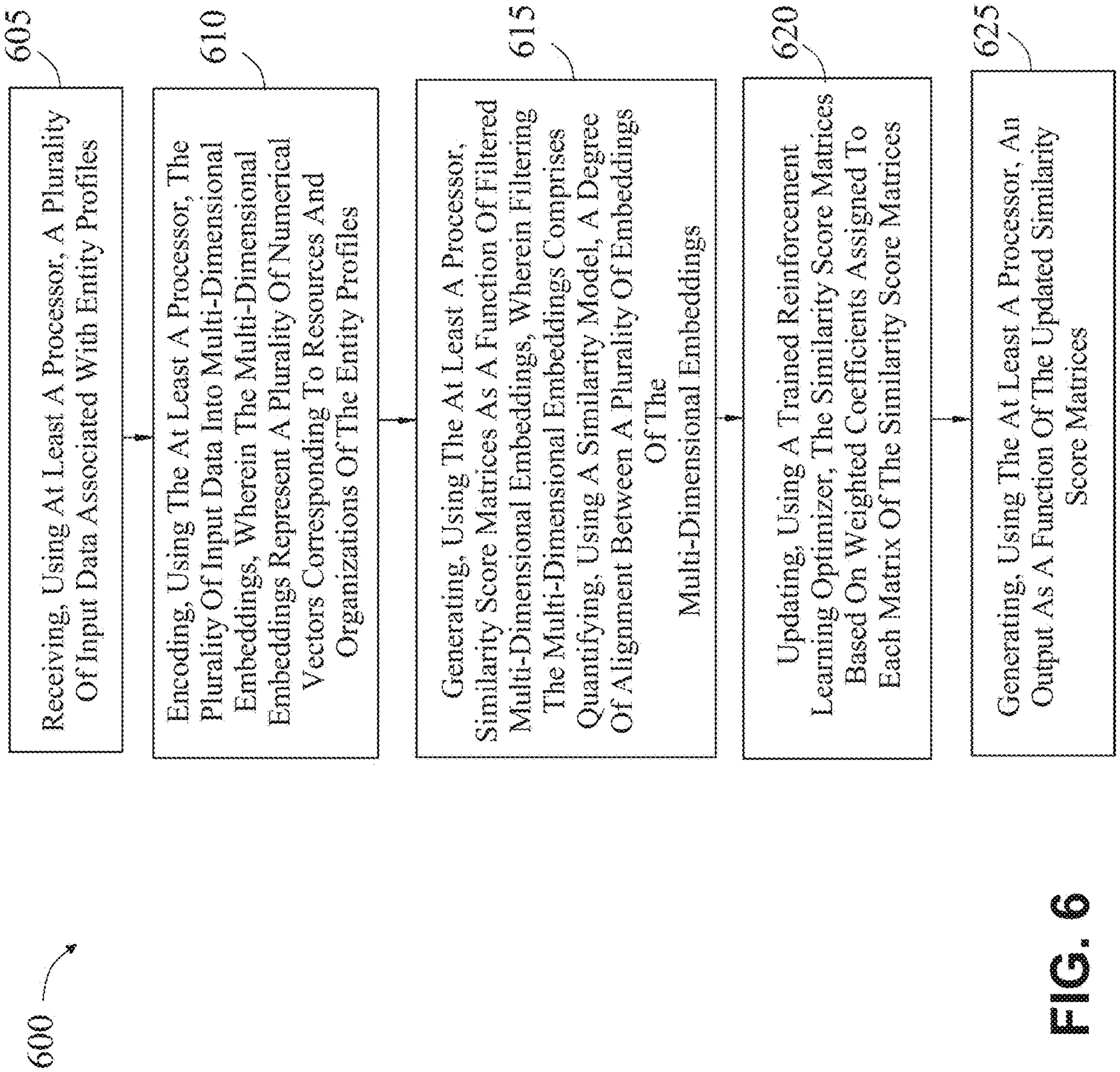
FIG. 6 is a block diagram of an exemplary method for determining an output comprising an updated similarity score matrices.

Referring now to FIG. 6, a flow diagram of an exemplary method 600 for determining an output comprising an updated similarity score matrices is illustrated. At step 605, method 600 includes receiving, using at least a processor, a plurality of input data associated with entity profiles. In an embodiment, the entity profiles may include a plurality of resource profiles associated with the resources and a plurality of organization profiles associated with the organizations. This may be implemented as described and with reference to FIGS. 1-5.

Still referring to FIG. 6, at step 610, method 600 includes encoding, using the at least a processor, the plurality of input data into multi-dimensional embeddings, wherein the multi-dimensional embeddings represent a plurality of numerical vectors corresponding to resources and organizations of the entity profiles. This may be implemented as described and with reference to FIGS. 1-5.

Still referring to FIG. 6, at step 615, method 600 includes generating, using the at least a processor, similarity score matrices as a function of filtered multi-dimensional embeddings, wherein filtering the multi-dimensional embeddings comprises quantifying, using a similarity model, a degree of alignment between a plurality of embeddings of the multi-dimensional embeddings. In an embodiment, the at least a processor may be further configured to filter the multi-dimensional embeddings, wherein filtering the multi-dimensional embeddings comprises quantifying, using a similarity model, a degree of alignment between a plurality of embeddings of the multi-dimensional embeddings. In an embodiment, the at least a processor may be further configured to determine the degree of alignment between the plurality of embeddings by performing a cosine similarity operation across vector dimensions of the plurality of embeddings and executing a collaborative filtering process to adjust similarity values as a function of historical correlation weights. This may be implemented as described and with reference to FIGS. 1-5.

Still referring to FIG. 6, at step 620, method 600 includes updating, using a trained reinforcement learning optimizer, the similarity score matrices based on weighted coefficients assigned to each matrix of the similarity score matrices. In an embodiment, the at least a processor may be further configured to train the reinforcement learning optimizer using optimizer training data, wherein the optimizer training data comprises historical similarity score matrices and corresponding reward signals, the reward signals quantifying performance outcomes of past weighting actions applied to the historical similarity score matrices. This may be implemented as described and with reference to FIGS. 1-5.

Still referring to FIG. 6, at step 625, method 600 includes generating, using the at least a processor, an output as a function of the updated similarity score matrices. In an embodiment, the at least a processor may be further configured to receive additional input data from an entity through a graphical user interface, wherein the at least a processor is further configured to update the similarity score matrices as a function of the additional input data. In an embodiment, the at least a processor may be further configured to execute a downstream model as a function of the output, wherein the downstream model is configured to match at least a resource of the resources to at least an organization of the organizations. In an embodiment, the at least a processor may be further configured to refine the output using the trained reinforcement learning optimizer based on a growth datum, wherein the growth datum is calculated as a function of an accuracy score of historical match outputs and an error reduction rate determined across successive optimization iterations. In an embodiment, the at least a processor may be further configured to display, using a user interface, the output by ranking the updated similarity score matrices, wherein each matrix comprises metadata associated with the resources and organizations. In an embodiment, the at least a processor may be further configured to compress the multi-dimensional embeddings into reduced-dimensional vectors using a dimensionality reduction technique, wherein the reduced-dimensional vectors are configured to minimize storage and preserve similarity relationships among the entity profiles. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
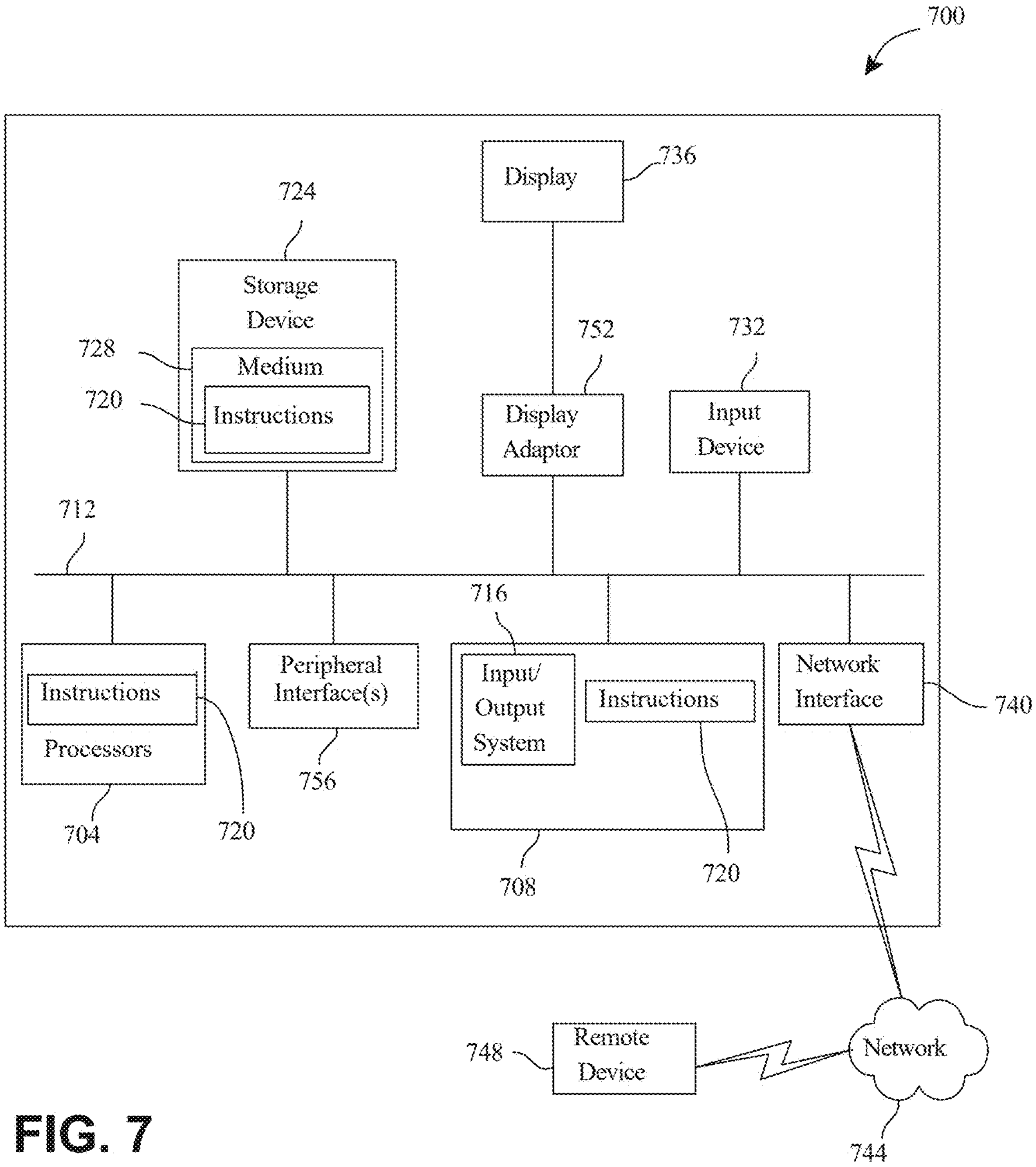
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining an output comprising an updated similarity score matrices, wherein the apparatus comprises:
- at least a computing device, wherein the computing device comprises:
  - a memory; and
  - at least a processor communicatively connected to the memory, wherein the memory contains instructions configuring the at least a processor to:
    - receive a plurality of input data associated with entity profiles;
    - encode the plurality of input data into multi-dimensional embeddings, wherein the multi-dimensional embeddings represent a plurality of numerical vectors corresponding to resources and organizations of the entity profiles;
    - generate similarity score matrices as a function of filtered multi-dimensional embeddings;
    - update, using a trained reinforcement learning optimizer, the similarity score matrices based on weighted coefficients assigned to each matrix of the similarity score matrices;
    - execute a machine learning model to dynamically adjust at least one operational parameter of the trained reinforcement learning optimizer based on patterns detected in the multi-dimensional embeddings and the similarity score matrices; and
    - generate, using the at least a processor, an output as a function of the updated similarity score matrices.

2. The apparatus of claim 1, wherein the at least a processor is further configured to train the reinforcement learning optimizer using optimizer training data, wherein the optimizer training data comprises historical similarity score matrices and corresponding reward signals, the reward signals quantifying performance outcomes of past weighting actions applied to the historical similarity score matrices.

3. The apparatus of claim 1, wherein the at least a processor is further configured to filter the multi-dimensional embeddings, wherein filtering the multi-dimensional embeddings comprises quantifying, using a similarity model, a degree of alignment between a plurality of embeddings of the multi-dimensional embeddings.

4. The apparatus of claim 3, wherein the at least a processor is further configured to determine the degree of alignment between the plurality of embeddings by:
- performing a cosine similarity operation across vector dimensions of the plurality of embeddings; and
- executing a collaborative filtering process to adjust similarity values as a function of historical correlation weights.

5. The apparatus of claim 1, wherein the at least a processor is further configured to receive additional input data from an entity through a graphical user interface, wherein the at least a processor is further configured to update the similarity score matrices as a function of the additional input data.

6. The apparatus of claim 1, wherein the at least a processor is further configured to execute a downstream model as a function of the output, wherein the downstream model is configured to match at least a resource of the resources to at least an organization of the organizations.

7. The apparatus of claim 1, wherein the entity profiles comprise a plurality of resource profiles associated with the resources and a plurality of organization profiles associated with the organizations.

8. The apparatus of claim 1, wherein the at least a processor is further configured to refine the output using the trained reinforcement learning optimizer based on a growth datum, wherein the growth datum is calculated as a function of an accuracy score of historical match outputs and an error reduction rate determined across successive optimization iterations.

9. The apparatus of claim 1, wherein the at least a processor is further configured to display, using a user interface, the output by ranking the updated similarity score matrices, wherein each matrix comprises metadata associated with the resources and organizations.

10. The apparatus of claim 1, wherein the at least a processor is further configured to compress the multi-dimensional embeddings into reduced-dimensional vectors using a dimensionality reduction technique, wherein the reduced-dimensional vectors are configured to minimize storage and preserve similarity relationships among the entity profiles.

11. A method for determining an output comprising an updated similarity score matrices, wherein the method comprises:

receiving, using at least a processor, a plurality of input data associated with entity profiles;

encoding, using the at least a processor, the plurality of input data into multi-dimensional embeddings, wherein the multi-dimensional embeddings represent a plurality of numerical vectors corresponding to resources and organizations of the entity profiles;

generating, using the at least a processor, similarity score matrices as a function of filtered multi-dimensional embeddings, wherein filtering the multi-dimensional embeddings comprises quantifying, using a similarity model, a degree of alignment between a plurality of embeddings of the multi-dimensional embeddings;

updating, using a trained reinforcement learning optimizer, the similarity score matrices based on weighted coefficients assigned to each matrix of the similarity score matrices;

executing, using the at least a processor, a machine learning model to dynamically adjust at least one operational parameter of the trained reinforcement learning optimizer based on patterns detected in the multi-dimensional embeddings and the similarity score matrices; and generating, using the at least a processor, an output as a function of the updated similarity score matrices.

12. The method of claim 11, further comprising training, using the at least a processor, the reinforcement learning optimizer using optimizer training data, wherein the optimizer training data comprises historical similarity score matrices and corresponding reward signals, the reward signals quantifying performance outcomes of past weighting actions applied to the historical similarity score matrices.

13. The method of claim 11, further comprising determining, using the at least a processor, the degree of alignment between the plurality of embeddings by: performing, using the at least a processor, a cosine similarity operation across vector dimensions of the plurality of embeddings; and executing, using the at least a processor, a collaborative filtering process to adjust similarity values as a function of historical correlation weights.

14. The method of claim 11, further comprising receiving, using the at least a processor, additional input data from an entity through a graphical user interface, wherein the at least a processor is further configured to update the similarity score matrices as a function of the additional input data.

15. The method of claim 11, further comprising executing, using the at least a processor, a downstream model as a function of the output, wherein the downstream model is configured to match at least a resource of the resources to at least an organization of the organizations.

16. The method of claim 11, wherein the entity profiles comprise a plurality of resource profiles associated with the resources and a plurality of organization profiles associated with the organizations.

17. The method of claim 11, further comprising refining, using the at least a processor, the output using the trained reinforcement learning optimizer based on a growth datum, wherein the growth datum is calculated as a function of an accuracy score of historical match outputs and an error reduction rate determined across successive optimization iterations.

18. The method of claim 11, further comprising displaying, using a user interface, the output by ranking the updated similarity score matrices, wherein each matrix comprises metadata associated with the resources and organizations.

19. The method of claim 11, further comprising compressing, using the at least a processor, the multi-dimensional embeddings into reduced-dimensional vectors using a dimensionality reduction technique, wherein the reduced-dimensional vectors minimizes storage and preserves similarity relationships among the entity profiles.

* * * * *